United States Patent
Petersen

(12) 
(10) Patent No.: US 6,270,348 B1
(45) Date of Patent: Aug. 7, 2001

(54) CHOPPED FIBER REINFORCED DENTAL MATERIAL

(76) Inventor: Richard Petersen, 5000 Oak St. #1117, Kansas City, MO (US) 64112

( * ) Notice: Subject to any disclaimer, the term of this patent is extended or adjusted under 35 U.S.C. 154(b) by 0 days.

(21) Appl. No.: 09/259,317

(22) Filed: Mar. 1, 1999

(51) Int. Cl.[7] .................................................. C08K 9/00
(52) U.S. Cl. ...................... 433/228.1; 523/116; 523/217
(58) Field of Search .................................. 433/220, 224, 433/228.1; 523/113, 116, 117, 217

(56) References Cited

U.S. PATENT DOCUMENTS

| | | | |
|---|---|---|---|
| 4,217,264 | * | 8/1980 | Mabie et al. ........................ 260/42.15 |
| 4,427,799 | | 1/1984 | Orlowski et al. . |
| 4,567,030 | | 1/1986 | Yuasa et al. . |
| 4,738,722 | | 4/1988 | Ibsen et al. . |
| 4,781,940 | | 11/1988 | Denton, Jr. . |
| 4,793,809 | | 12/1988 | Sigler et al. . |
| 4,859,716 | | 8/1989 | Ibsen et al. . |
| 5,051,130 | | 9/1991 | Futami et al. . |
| 5,228,907 | | 7/1993 | Eppinger et al. . |
| 5,354,785 | | 10/1994 | Rheinberger et al. . |
| 5,425,640 | | 6/1995 | Scharf . |
| 5,621,035 | | 4/1997 | Lyles et al. . |
| 5,681,872 | | 10/1997 | Erbe . |
| 5,769,638 | | 6/1998 | Torabinejad et al. . |
| 5,773,489 | | 6/1998 | Sato . |
| 5,797,748 | * | 8/1998 | Reynaud et al. ...................... 433/224 |
| 5,861,445 | * | 1/1999 | Xu et al. ............................... 523/116 |
| 5,869,178 | * | 2/1999 | Kusy et al. ........................... 428/335 |
| 5,919,044 | * | 7/1999 | Sicurelli, Jr. et al. ............... 433/220 |
| 5,951,295 | * | 9/1999 | Lyles et al. ....................... 433/228.1 |

OTHER PUBLICATIONS

Properties of a Silica–Reinforced Polymer for Dental Restorations, Bowen, pp. 1–11 ©1990–1997, Ada (Jada or CD–ROM), 1963, Jan. 57–67.

Fracture Resistance of a Fiber–Reinforced Film Adhesive, Shetty et al. Scripta Materialia, vol. 37, No. 6, pp. 787–792, 1997.

Effects of Various Finishing Devices on Resin Surfaces, Johnson et al., pp. 321–330 Jada, vol. 83, Aug. 1971.

Physical and Mechanical Properties of Composite Restorative Materials, Macchi, pp. 328–332, Jada vol. 78, Feb. 1969.

* cited by examiner

*Primary Examiner*—Ralph A. Lewis
(74) *Attorney, Agent, or Firm*—Bell, Boyd & Lloyd LLC

(57) ABSTRACT

A silane treated high purity chopped quartz fiber reinforced dental composite material having increased viscosity for improved handling ability, reduction in porosity, elimination of edge-void defects and improved reestablishment of interproximal contacts. The fiber ductility specifically permits bending and confirmation within small geometrical boundaries to approximate continuous fiber strengths without incurring excessive breakage or voids.

10 Claims, 13 Drawing Sheets

CHOPPED FIBER REINFORCED DENTAL MATERIAL

BACKGROUND OF THE INVENTION

1. Field of the Invention

The present invention relates, generally, to a fiber reinforced dental material for use in various restorative dental procedures and, more particularly, to a silane treated high purity chopped quartz fiber reinforced composite dental material which substantially addresses the difficulties in reestablishing interproximal contact, proximal voids, finishing, postoperative sensitivity and insufficient mechanical strengths associated with known composite materials.

2. Description of the Prior Art

Following the first introduction of posterior composites almost 40 years ago, there has been an increasing interest in its development by an esthetic-oriented patient population. The early attempts to replace silver resulted in numerous clinical failures, but the driving incentive had been created. Photocuring was a big step in reducing oxygen-inhibited polymerization that is hand mixed in during a chemical cure, which subsequently reduces strengths, and increases wear rates. During this development there has been some confusion in terminology. Microfills, actually 20–50 nanometer amorphous colloidal silica filled resins, were introduced to counteract excessive wear rates. But difficulties with high surface areas and Van der Waals forces of agglomeration prevented high filler loading due to uncontrollable thick viscosity consistencies. Nonetheless, microfill composites were easy to finish and prevented early particle "plucking" or pullout associated with larger particle filler. Soon strengths were improved with "hybrids" where larger particles were mixed in with colloidal silica. Polymerized high particle-filled composites were also ground down and mixed back into a resin paste with colloidal silica and known as "heterogeneous microfills." Currently, "universal composites" have reduced the average particle size by improving packing fractions and increased weight and volume percentages to a point where wear rates are now approaching those of silver fillings. Be that as it may, none of the particles employed in prior art particle-filled resins were ever larger than 100–200 microns. Indeed, excessively long fillers were summarily dismissed as being impractical for finishing purposes.

As an additional historical note, the progress of Bis-GMA and silane coupling combined with radiopaque barium glass filler initiated clinical trials and commercialization of tooth colored fillings for posterior teeth in the 60's. Although none of the early posterior Bis-GMA dental composite formulations were successful, significant improvements have come in stages to stimulate the use of dental resins to such an extent that they now rival amalgam as a restorative option. In fact, 23% of all dentists now indicate that composite is their material of choice for class II restorations.

Still many problems exist with the contemporary generation of posterior composites. They are still relatively difficult to handle, although experience and familiarity reduce this trouble. Concerns over, primarily, class II composite restorations have been highlighted recently through the American Dental Association, which described the most common complaints among practicing dentists. The primary objection is the inability to restore the proximal contact. Voids, particularly in the interproximal box, are a second area of criticism. Additional concerns are in the areas of finishing effort and the occurrence of post-operative sensitivity.

SUMMARY OF THE INVENTION

Accordingly, the present invention describes a chopped fiber glass reinforcement for dental filling composites wherein the individual fibers have a preferred length of approximately 3 mm and a preferred width of approximately 10 microns. In particular, high purity chopped quartz fiber is identified as an eminent performance material speciality within this new field of dental technology in addition to the more common forms of fiber, such as E-glass (electrical grade), S-glass (high tensile strength grade), C-glass (chemical grade), etc. The chopped fibers build viscosity into a dental filling paste disproportionately relative to their lengths over standard dental composite particulate reinforcement. Increasing the viscosity improves handling ability by the dentist, thus allowing for silver amalgam-like condensation for controlled placement, reduction in porosity, elimination of edge-void defects and improved reestablishment of the interproximal contact. Fiber ductility specifically permits bending and conformation within small geometrical boundaries to approximate continuous fiber strengths without excessive breakage or voids being produced. This allows greater realization of the potential fiber composite's enabling strength capacity. Chopped fiber reinforced composite exhibits Bingham Plastic behavior, through internal fiber resin extrusion, wherein it efficiently fills surface defects and internal voids. The fiber resin pre-impregnation is emphasized which favors the potential stress transfer characteristics of the stronger fibers to the weaker matrix.

Accordingly, in an embodiment of the present invention, a dental material is disclosed which includes: a resin; and a plurality of silica-based fibers mixed into the resin, wherein each of the silica-based fibers has a length of at least 1 mm.

In an embodiment, the dental material includes silica-based fibers which have a length of at least 2 mm.

In an embodiment, the dental material includes silica-based fibers which have a length of at least 3 mm.

In an embodiment, the dental material includes silica-based fibers which are less than 60% by weight silica.

In an embodiment, the dental material includes silica-based fibers which are 60–70% by weight silica.

In an embodiment, the dental material includes silica-based fibers which are greater than 70% by weight silica.

In an embodiment, the dental material includes silica-based fibers which are quartz.

In an embodiment, the dental material further includes a radiopaque material.

In an embodiment, the radiopaque material includes Barium.

In an embodiment, the radiopaque material includes Zirconium.

In another embodiment of the present invention, a method of restoration of a dental void is disclosed which includes the steps of: providing a first dental material having silica-based fibers; compacting the first dental material into a lower area of the void so as to substantially fill the lower area; providing a second non-fibrous dental material; and applying the second non-fibrous dental material to an upper area of the void upon an upper surface of the first dental material so as to substantially fill the upper area.

In an embodiment, the method further includes the step of compacting, initially, the second non-fibrous dental material into a lowermost area of the void prior to the step of compacting the first dental material.

In an embodiment of the method, the first dental material includes a resin impregnated with the silica-based fibers wherein the silica-based fibers each have a length of at least 1 mm.

In an embodiment of the method, the first dental material includes a resin impregnated with the silica-based fibers, wherein the silica-based fibers each have a length of at least 2 mm.

In an embodiment of the method, the first dental material includes a resin impregnated with the silica-based fibers, wherein the silica-based fibers each have a length of at least 3 mm.

In an embodiment of the method, the silica-based fibers are less than 60% by weight silica.

In an embodiment of the method, the silica-based fibers are 60–70% by weight silica.

In an embodiment of the method, the silica-based fibers are greater than 70% by weight silica.

In an embodiment of the method, the silica-based fibers are quartz.

In an embodiment, the method further includes the step of impregnating the first dental material with a radiopaque material.

In an embodiment of the method, the radiopaque material includes Barium.

In an embodiment of the method, the radiopaque material includes Zirconium.

Additional features and advantages of the present invention are described in, and will be apparent from, the Detailed Description of the Preferred Embodiments and the Description of the Drawings.

DETAILED DESCRIPTION OF THE PREFERRED EMBODIMENTS

Materials Properties

Figure 1:
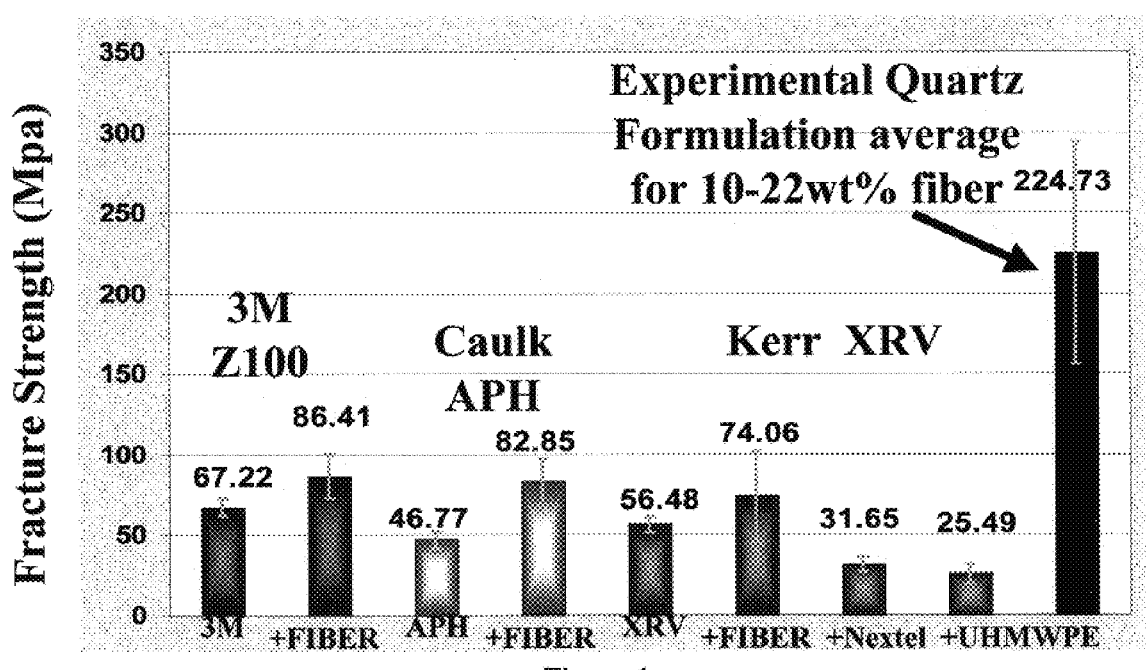
FIG. 1 shows a chart of the fracture strength of various composite materials with and without the addition of chopped quartz fibers.

The materials to be considered presently to compliment glass particulate reinforced dental resins have all demonstrated high modulus formulations in fiber form. Although high purity chopped quartz fiber is emphasized in a preferred embodiment, there are other chopped glass fibers available such as S-glass (high strength), E-glass (electrical grade), C-glass (chemical grade), etc. that can interact at some similar level of performance. Table 1 gives the average range of chemical compositions in weight percent for these common glass fibers.

TABLE 1

WEIGHT PERCENT COMPOSITE OF E-GLASS, S-GLASS AND HIGH PURITY QUARTZ FIBER

| Chemical Composite | E-glass | S-Glass | High Purity Chopped Quartz Fiber |
|---|---|---|---|
| Silicon Dioxide | 52–60% | 64–66% | 9.95% |
| Aluminum Oxide | 12–16% | 24–26% | |
| Calcium Oxide | 16–25% | | |
| Boron Oxide | 8–13% | | |
| Magnesium Oxide | 0–6% | 9–11% | |
| Sodium and Potassium Oxide | 0–1% | | |

The Quartz Fiber is preferably provided from the manufacturer with an epoxy compatible amino silane binder wherein, combined with its ability to transmit light, perhaps even in fiber optic form, it provides an esthetic translucent addition. One property of particular interest surrounding high purity quartz fiber is the low dielectric, which allows quartz to be used in electronic applications. The low electrical transmission state combined with the extremely high chemical resistance of quartz imparts longevity by reducing water uptake. The fiber itself has a modulus of 72 Gpa that closely approaches enamel. Quartz fiber light transmission is also considered to be one of the highest, which can provide curing qualities over other fibers. At a preferred embodiment length and width of approximately 3 mm and 10 microns, respectively, the continuous strengths should be approached to some extent in a confined dental restoration as a consequence of this fiber's ability to bend and conform without fully breaking which could potentially create detrimental weakening voids.

UHMWPE will be contemplated now only in particulate form due to its commercial availability with surface modifications and coupling that enhances its incorporation into a resin matrix. The particulate is a white opaque powder that has acceptable light transmission. However, being manufactured as moderately large micron white particle filler interferes with realizing this material's potential in a dental filling.

UHMWPE is a low dielectric material which affords hydrophobic protection. As a thermoplastic, it should act as a toughening agent to damp, adsorb energy and improve fatigue along with impact strengths. Consequently, however, it reduces fracture strengths and modulus. UHMWPE does have a stress creep component to flow and may possibly act in a manner similar to amalgams to seal margins. High performance coupling with finer particle size availability appears as a step in the right direction in developing this material into dental composites. Eventually, nonleaching polymer antimicrobials could be incorporated to mimic amalgam surface antibacterial properties as a low filled partial polymer matrix composite complementing normal inorganic reinforcement. Subsequently, it may be expected that the slow minor hydrophobic water uptake associated with UHMWPE could act as a safe structural creep component to help seal margins over time.

The unique properties of Bis-GMa, isopropylidene bis (p-phenoxy (2-hydroxytrimethylene) dimethacrylate or bisphenol A glycidyl methacrylate, and TEGMA, triethylene glycol dimethacrylate, are also contemplated in connection with the present invention. Primarily it is the long extended saturated chain and reduced polymerization shrinkage that has made Bis-GMA the standard dental resin. However, the viscosity of Bis-GMA is unmanageably high, requiring the addition of diluents, most notably TEGDMA, to allow incorporation of reinforcement filler at a workable viscosity without mixing in strength reducing porosity. In relation to BIS-GMA (7000,000 cps), TEGDMA (8 cps) has a viscosity that approaches the methylmethacrylate monomer. Critical polymer chain entanglements occur above methylmethacrylate, (C-number 5), and TEGDMA, (C-number 14), which are entirely realized in the high viscous Bis-GMA, (C-number 29, two benzene rings).

Camphorquinone is used as the photoinitiator with a broad adsorption band extending from 400–520 nanometers with a maximum at 468 nanometers. Dimethylamino ethylmethacrylate (DMAEMA) is added as a reducing agent that combines with the camphoquinone photosensitizer to enhance and extend this action through the formation of a triplex exiplex into two free radicals of which the amine is considered more active.

Barium silicate glass, the current standard for dental composite reinforcement, was developed initially by the National Institute of Standards and Technology (NIST) to allow x-ray examination and diagnosis of white fillings. Radiopaque composite dental fillings are particularly important to detect recurrent decay and the possibility of void-edge defects in the gingival-proximal box.

Radiopaque glass filler required for diagnostic purposes has been identified as a critical problem in dental composites. The need to add high atomic number elements such as barium is thought to weaken the glass crystal structure to reduce chemical resistance and increase hydrolytic degradation. The refractive index of radiopaque elements is much higher which also interferes with visible light curing. Even silane treatment is compromised as a result of less silica being at the surface to interact and pH surface potentials that are not recommended for best silanation. Quartz and its fibers, on the other hand, are well known for their high chemical resistance.

Silanation is completed with the common dental coupling agent, gamma methoxypropyltrimethoxysilane with a rotary evaporator for 30 minutes in 10% slurry of isopropanol, dried overnight and briefly dried again at 110 degrees centigrade. Silane treatment improves resin wetting of the reinforcement glass to reduce voids that result in concentrated stress areas, increased moisture adsorption and electrical pathways that accelerate material failure. Nonmetallic equipment is necessary for silanation to prevent dielectric contaminants and unaesthetic staining.

3M's Z100 was selected as a more than representative general control for posterior composites due to its exceptional mechanical and cure properties that appears to surpass many current competitors. In addition to the homogeneous universal Z100, two additional heterogeneous universal composites from different companies have been selected for fracture evaluation.

Composite Materials

Universal commercial pastes from three major dental corporations were used to make comparisons of various additions of chopped quartz fiber. The three universal composites are described in Table 2.

TABLE 2

UNIVERSAL POSTERIOR DENTAL COMPOSITES

| Company | Brand Name | Average Particle Size | Filler Weight % | Filler Volume % |
|---|---|---|---|---|
| 3M | Restorative Z100 | 0.6 microns | 84.5 | 66 |
| Kerr | Herculite XRV | 0.6 microns | 78 | 56 |
| Caulk | Prisma APH | 1.0 microns | 78 | 53 |

The sample preparation of the commercial composite samples as received and all others following various additive percentages of quartz fibers was completed on a 2.5×4.0× 0.25 inch glass-mixing slab confined by two parallel brass plates 1.6 mm thick. Two 2.0 mm composite spacers with elastomer caps were then placed approximately 25 mm apart. This assembly was subsequently fixed in place with two clamps. Composite was placed within the 1.6×2×25-mm area, overcondensed and laterally extruded by top compression with a glass microscope slide. Curing was done for one minute on each side with a Coe visible light course, calibrated at 400 Mw/CM2 on a Demetron Radiometer. A short series of tests on UHMWPE particulate and Nextel ceramic fiber was also initiated. The UHMWPE is pretreated as supplied by the manufacturer and the Nextel was heat cleaned by 3M to remove all binder. Silanation of the ceramic fiber was accomplished by a rotary evaporator in a isopropyl alcohol slurry, dried overnight and heated to 110 degrees Centigrade for 30 minutes.

Three experimental formulations were prepared by first soaking quartz fibers in a 50:50 volume % TEDGMA:Bis-GMA mixture, (Esstech), containing camphorquinone and N,N dimethyl amino ethyl methacrylate (DMEAM). Additional Bis-GMA along with 1 micron average particle size Barium silicate glass (Ferro) as radiopacifier soaked in a 50:50TEGDMA:Bis-GMA mixture and colloidal silica (Cabot) were then incorporated to make a paste with the following percentages in formula I. Additional BaSiO2 glass and colloidal silica were added in to make formula II and quartz fiber was then placed in to develop formula III (Table 3).

Curing for the experimental composite formulations included additional steps of interposing a Mylar film between the composite and confining glass materials to prevent unwanted adhesion. As a consequence of the reduced light transmission, an extra 30 seconds was added to the cure on each side.

TABLE 3

EXPERIMENTAL FORMULATIONS (weight percentages)

|  | Formula I | Formula II | Formula III |
|---|---|---|---|
| Bis-GMA | 35.70 | 26.72 | 22.55 |
| TEGDMA | 15.80 | 11.74 | 9.92 |
| Total Resin | 51.50 | 38.46 | 32.47 |
| Quartz Fiber | 10.15 | 7.57 | 21.98 |
| BaSiO2 | 36.20 | 51.15 | 43.17 |
| Colloidal Silica | 1.65 | 2.39 | 2.02 |
| Total Reinforcement | 48.00 | 61.11 | 67.17 |
| Camphorquinone | 0.20 | .17 | .14 |
| 2 dimethylamino-ethylmethacrylate | 0.30 | .26 | .22 |
| Total | 100.00 | 100.00 | 100.00 |

The three-point flexural strength test, also referred to as transverse strength, fracture strength, modulus of rupture or bend strength, was chosen as a common analysis for screening dental composite samples. A National Institute of Standards and Technology traceable calibrated Omega Force Gauge recorded the three point fracture tests as peak force measured to the nearest 0.005 pounds. All lengths were maintained at a constant span distance of 20.5 mm. Loads were applied by visual sight at midspan. The height and width of all specimens were recorded from each fractured side and averaged. Flexural Strength was calculated from the following formula:

$$\text{Flexural Strength} = \frac{3\ FL}{2\ bd^2}$$

Where F is the peak yield force at failure, L is the distance between columns, b is the width and d is the thickness in height. Units were then converted from pounds/square inch to Megapascals.

Figure 2:
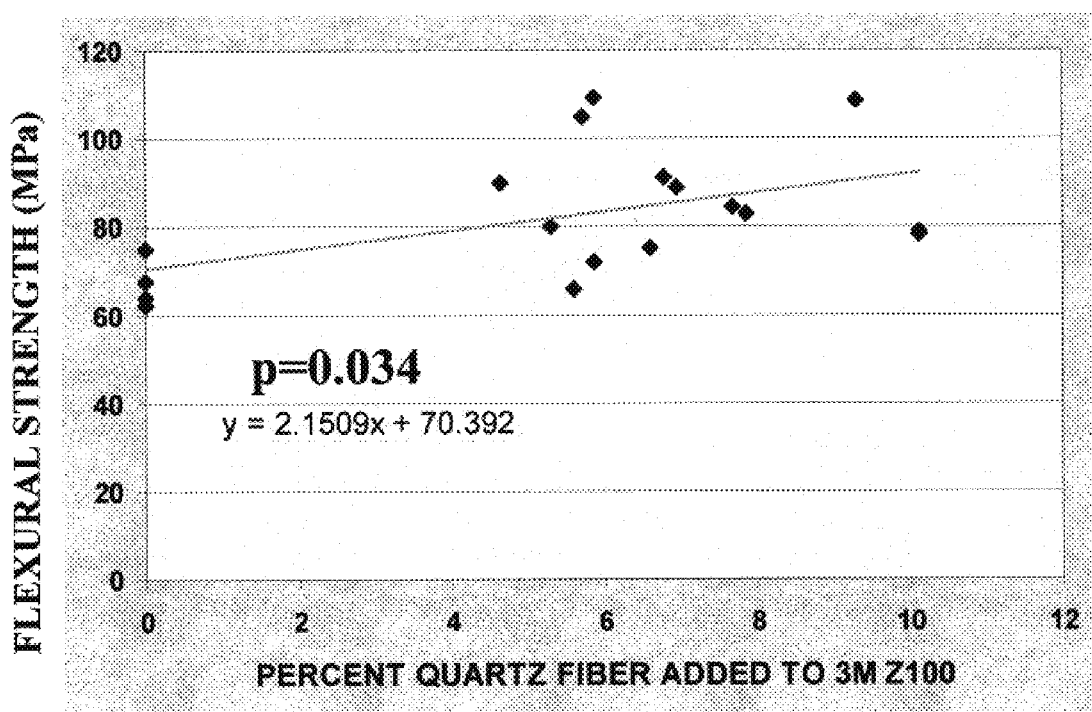
FIGS. 2–5 show charts of the flexural strength of various composite materials in relation to the percent quartz fiber added thereto.
Figure 3:
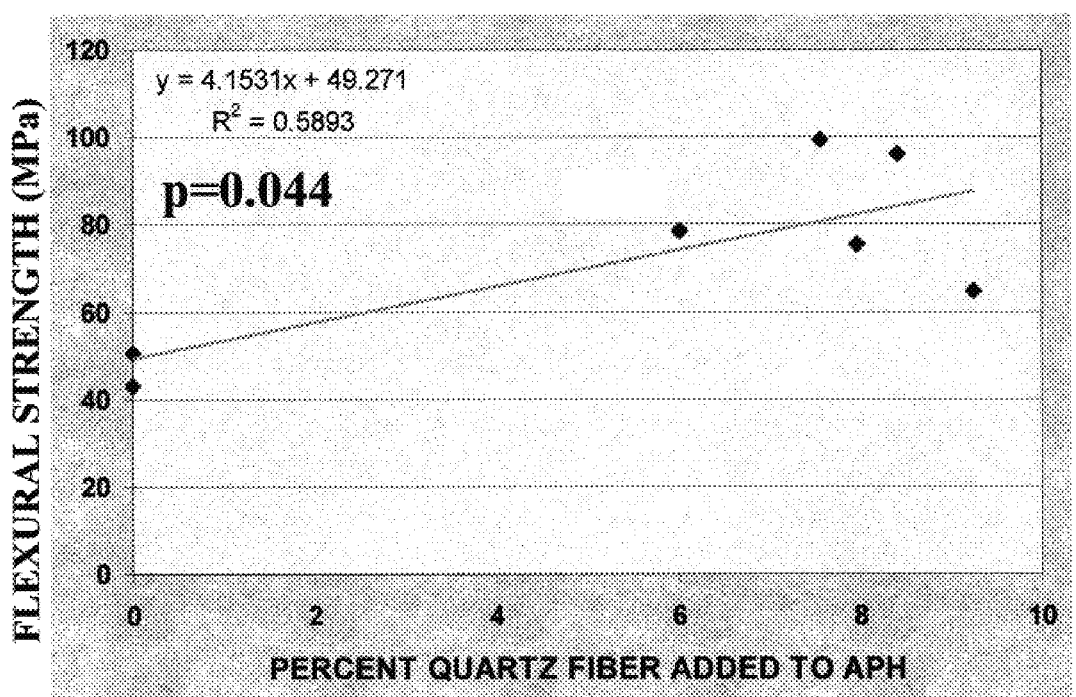
Figure 4:
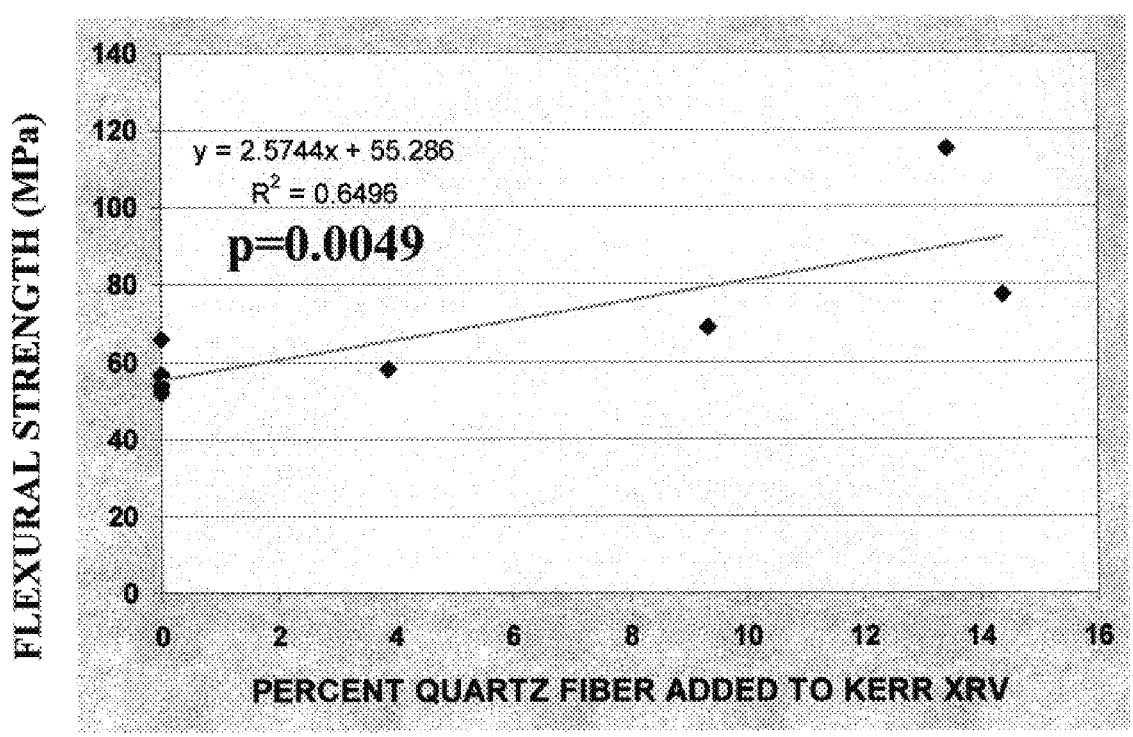

A radiograph was taken of a Z100 fracture specimen and experimental fracture sample on the same Eastman Kodak Ektapeed Film. The x-ray source was a Seimens 7 mA DC at 60 KeV for 0.16 seconds, developed with a A/T 2000 plus Air Techniques automatic film processor. Densitometer readings were completed after scanning and digitizing the radiograph in Molecular Analyst. Optical density measurements were taken four times with 10 observations for each sample. Mean optical density was used for comparisons, which are the average counts of the pixels within the object per unit area. The results are as follows:

Direct addition of chopped quartz fiber, ranging from 5 to 14 percent, to three of the most widely used universal composites resulted in significant statistical increase in flexural strength (See Table 4, FIG. 1). These percent additions of the quartz fibers were correlated in each case with this increase in flexural strength (See FIGS. 2–4).

TABLE 4

| | STATISTICS | | |
|---|---|---|---|
| Brand | Z100 | APH | XRV |
| Mean Flexural Strength | 67.22 | 46.77 | 56.48 |
| Mean Flexural Strength with Quartz fiber | 86.43 | 82.85 | 79.9 |
| T-Test | 2.747 | 3.251 | 2.318 |
| P value | 0.014 | 0.023 | 0.049 |
| Correlation p value | 0.033842 | 0.043899 | 0.0049 |
| N | 18 | 7 | 10 |
| Weight average % quartz fiber added | 6.99 | 7.84 | 10.26 |

Figure 5:
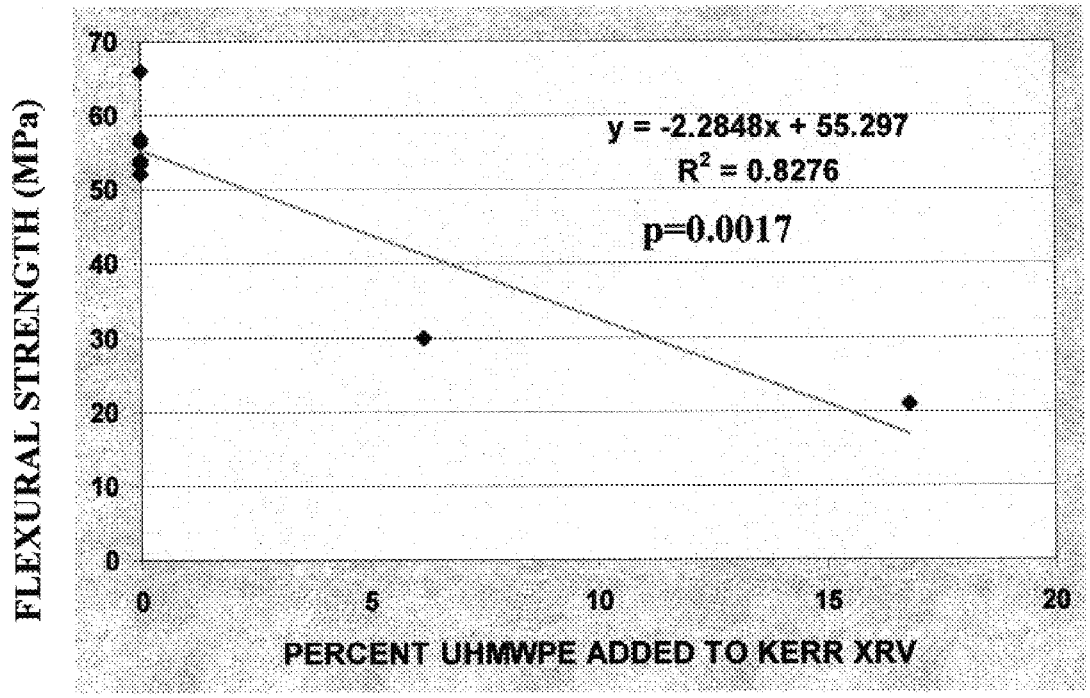

The addition of UHMWPE had the opposite effect on strength; statistically reducing the flexural strength as it was added to ZRV at a significant level. Nextel Ceramic Fiber also reduced material strength when mixed into the commercial XRV (See FIG. 5).

High purity quartz fiber, as received silanated by a proprietary process, has the ability to immediately increase the strengths of a universal composite, seen in three of the most commonly used brands when it is directly mixed in. When preimpregnated and wetted properly with a lower viscosity resin such as TEGDMA, these experimental improvements translate into high strengths even at adhesion-like fiber reinforcement loadings in a low condensable state. The preliminary x-ray film optical densities were likewise encouraging which, of course, is highly important for quality assurance and clinical diagnostic purposes.

Lower flexural strengths following the incorporation of UHMWPE particulate and Nextel Ceramic fibers were clearly evident. Void content is directly related to a reduction in material properties. Mechanical air entrapment during mixing is one of the more common means of incorporation of voids that, in turn, can also increase oxygen inhibition during the polymerization cure process. High modulus Nextel ceramic fibers are extremely brittle, prone to excessive breakage and splitting during the mixing process as they almost emulsify into the dental paste. Comparisons of earlier dental composites with glass rods that were seen fractured under microscopic analysis indicate this may be the source for strength reducing voids in ceramic fiber. UHMWPE, on the other hand, may be coupling poorly with the Bis-GMA/TEGDMA resin system.

High purity chopped quartz fiber reinforced dental resins have the ability to ensure heightened mechanical properties witnessed in early flexural strength tests. It is obvious from experimental results that fiber preimpregnation is crucial to ensure the proper realization of such strengths, and that the percent quartz fiber content strongly correlates with these strengthening capabilities.

Inter-Proximal Contact

Because of the increased use of dental composites to restore posterior teeth, complaints by dentists have been made known regarding the inability to obtain proximal contact in, primarily, class II restorations. A class II restoration is one which extends from the occlusal surface onto either the mesial, distal or both proximal surfaces. The low viscosity-state of the current dental restorative composite materials does not resist displacement along the matrix band once it is placed. As a result, the weak consistency paste tends to flow back toward the cavity preparation away from the adjacent tooth. Inability of the composite to be compacted with sufficient pressure produces inadequate force to press the retainer away from the cavity design against the adjoining teeth and increase the proximal contour.

3M's Z100 posterior composite was chosen as a representative sample to compare differences between two filler additions to increase viscosity. A combined quartz fiber/UHMWPE powder experimental composite was formulated to approximate the condensation viscosity of amalgam alloy. This experimental formulation was completed by incorporating aminosilane treated high purity chopped quartz fiber combined with UHMWPE powder into the commercial Z100 paste. The quartz fiber and UHMWPE powder were mixed by hand with a glass mortar and pestle to still maintain a relevant clinical tack or stickiness. Ingredients were weighed and recorded to the nearest 0.1 micrograms. The final formulation was calculated to be 4.85 weight percent quartz fiber and 4.45 weight percent UHMWPE, or 9.3 weight percent total. This first experimental formulation was then stored in an empty clean dental composite syringe tube. A second group of experimental formulations solely incorporating chopped quartz fiber into the commercial 3M Z100 was produced at different filler loadings at 9.2 average weight percent to achieve a moderately similar tack so as not to lose all stickiness. Mixing was accomplished either by hand separately with a Teflon composite spatula or in a larger amount with a glass mortar and pestle and forced into an empty commercial syringe for storage. All experimental pastes in this second group were developed to achieve a still workable tack in a similar range to the first combined experimental group. Variation in the second experimental formulation in terms of quartz weight percent was minimal and completed to make some initial comparisons on fracture strengths and condensation forces in relation to increasing quartz fiber loadings.

Two silver alloys from Kerr Dental were tested as current standards for restoring a class II proximal contact. Tytin FC is recommended as an ideal amalgam alloy example for restoring the interproximal contact. Tytin is a high copper spherical alloy that is one of the most popular brands in the United States. FC stands for "Firm Condensation", making Tytin FC a speciality modified version to improve viscosity, condensation pressures and, of course, the interproximal contact. A second high copper alloy from Kerr, brand name Contour, was tested to determine the effects of a highly condensable admix system with both spherical and lathe cut particles.

Figure 6:
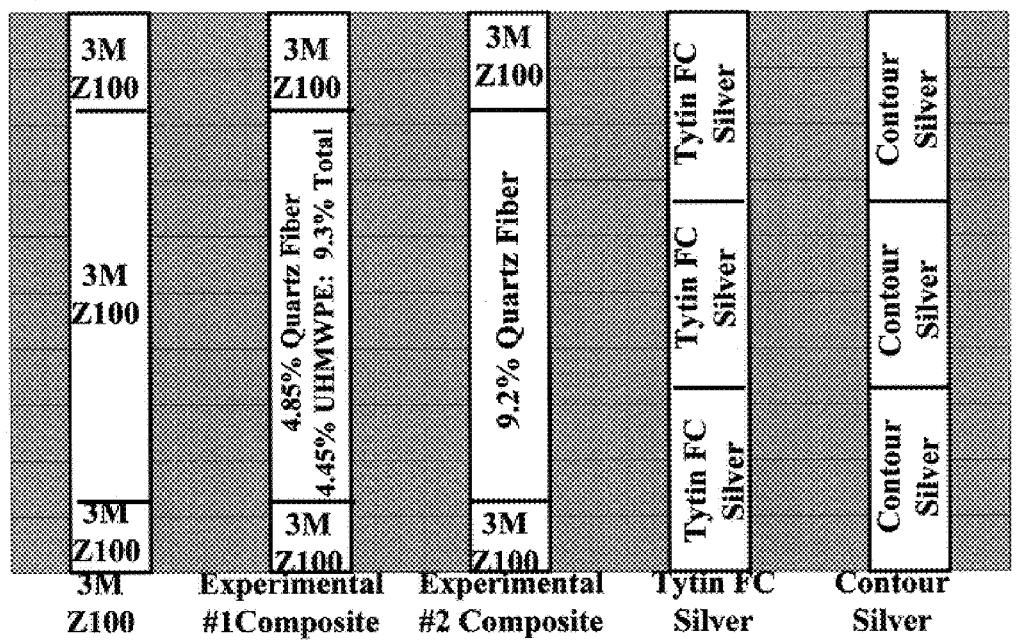
FIG. 6 shows a chart of various layered composite materials tested in connection with the present invention.

All composites were placed in three increments (occure) which are represented at an approximate nonspecific relative scale in FIG. 6.

1. Adhesive layer,
2. Bulk layer, and
3. Top surface layer.

Both the adhesive and top layers for all composites, including those placed within the bulk midlayer as experimental reinforced formulations, took advantage of the commercial Z100 posterior paste. The three different bulk middle composite layers included either:

1. Z100 or
2. The combined quartz fiber and UHMWPE formulation at 9.2 w % or
3. The quartz fiber formulation at 9.2 w %.

Composites were finished back and polished with the following sequence:

1. 3M Cuttle Disks
2. 2 Carbide finishing burs
3. Caulk Prisma disk and point
4. Caulk Prisma polishing cup with Prisma Gloss and Ultra Fine.

Silver fillings were carbed back with the successive order:

1. Cleoid burnisher
2. Pigtail explorer
3. Cleoid Discoid Carver
4. Hollenbeck Carver
5. Margin Trimmer.

Embrasure margins were carved flush, but ideal contours were sacrificed, maximizing each and every interproximal contact area to be equalize testing of this one measurement. Ultimately it is assumed that extra material or larger, overcontoured contact areas will be easier in a clinical situation to finish back into perfect conformation rather than risk the undesirable formation of questionable, undercontoured contact areas that may need to be replaced.

Figure 7:
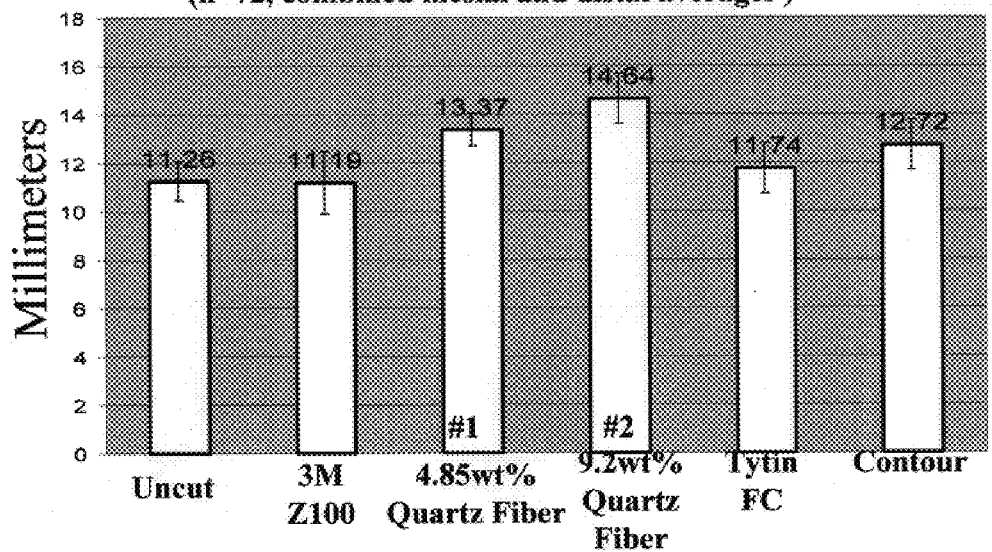
FIG. 7 shows a chart of the interproximal contact circumference value of various composite materials.

Due to the well-controlled nature of these tests and high degree of variability between groups, all materials showed statistically significant differences between one another when comparing the interproximal circumference (FIG. 7). Although achieving lower values than all other fillings, when carefully placed increments are inserted in a cocure sequence, even on this larger three surface cavity preparation, Z100 was able to restore the contact area at a level equivalent to the original standard uncut tooth. The addition of quartz fiber at a 9.2 Wt % average to the Z100 and also the combined quartz fiber/UHMWPE 9.3 w % formulation could both statistically achieve larger contact areas than either high viscosity amalgams chosen for this experiment (p=0.0001). The 9.2% all-quartz fiber resulted in a statistically significant difference over the 9.3% combined formulation of UHMWPE/quartz fiber (p=0.0001). Finally, the higher aspect ratio admix amalgam system with lathe cut particles in Contour demonstrated a significant increase in the contact area over the spherical Tytin FC system (p=0.00001).

Figure 8:
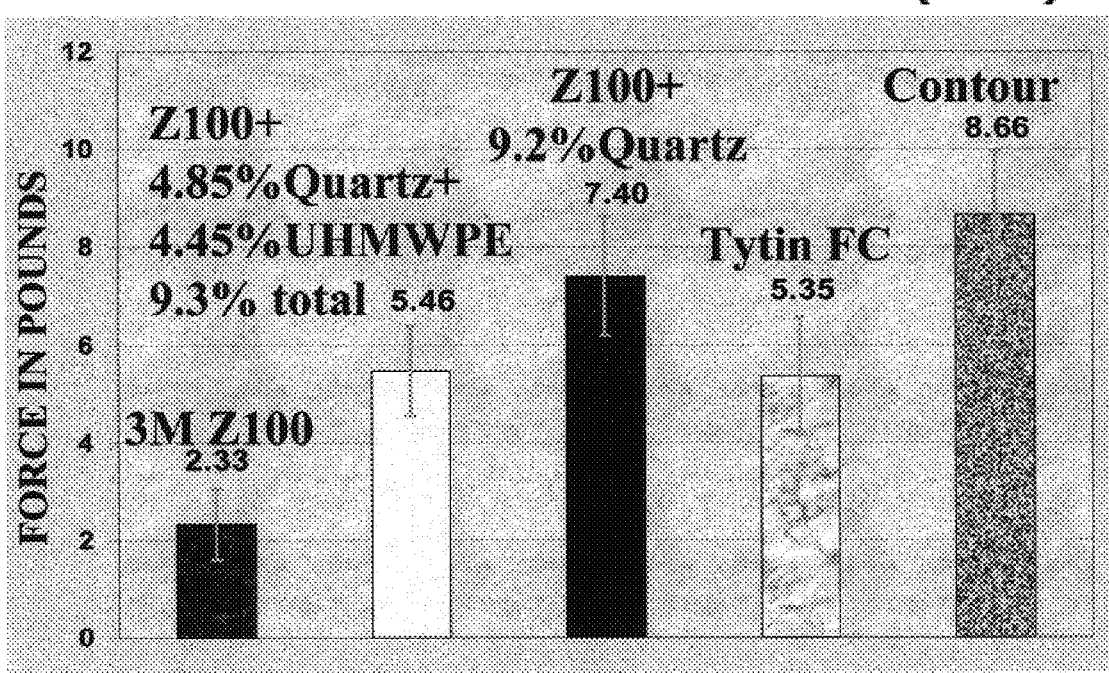
FIG. 8 shows the average peak condensation force for various composite materials.

Statistically significant differences between peak condensation forces were noted between all groups at p=0.000 except for the admix Contour alloy over the improved quartz experimental formula at p=0.01 and Tytin FC along with the first experimental formulation with quartz/UHMWPE 9.3 wt % having the same approximate values. The commercial Z100 attained condensation forces much lower than all groups. The experimental formulation with Quartz Fiber/UHMWPE and the commercial Tytin FC had the same approximate forces. Higher additions of quartz fiber disproportionately increased forces, accomplishing an average peak value higher than Tytin FC, although still lower than Contour. The combined spherical and lathe cut admixed system of Contour demonstrated superior condensation forces greater than the spherical Tytin FC (FIG. 8).

Figure 9:
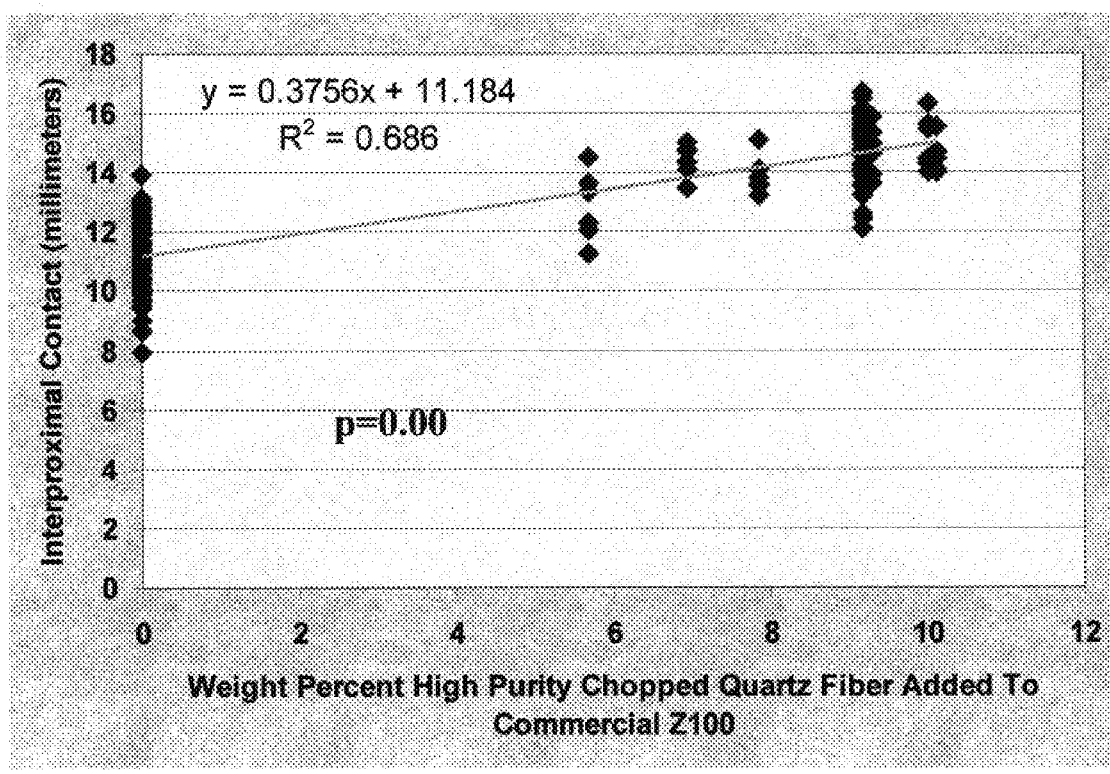
FIG. 9 shows the interproximal contact measurement of the commercial Z100 composite material in relation to the percent quartz fiber added thereto.
Figure 10:
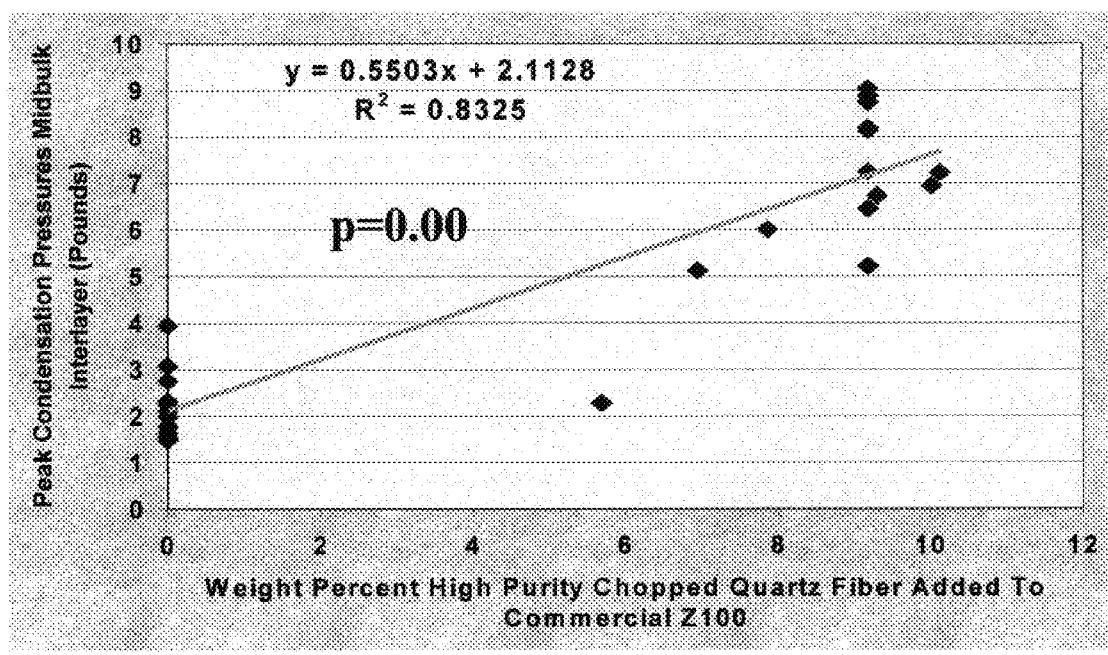
FIG. 10 shows a chart of the average peak condensation force of the commercial Z100 composite material in relation to the weight percent of quartz fiber added thereto.
Figure 11:
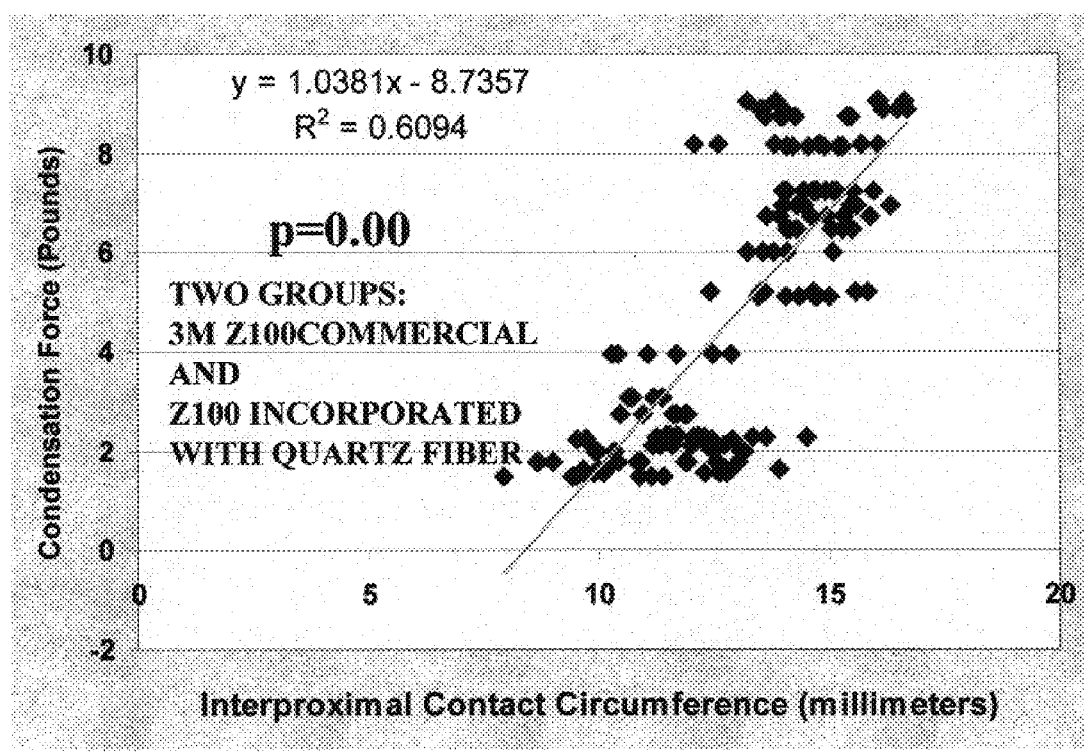
FIG. 11 shows a chart of the condensation force of Z100 composite material, with and without the addition of quartz fiber, in relation to interproximal contact circumference.
Figure 12:
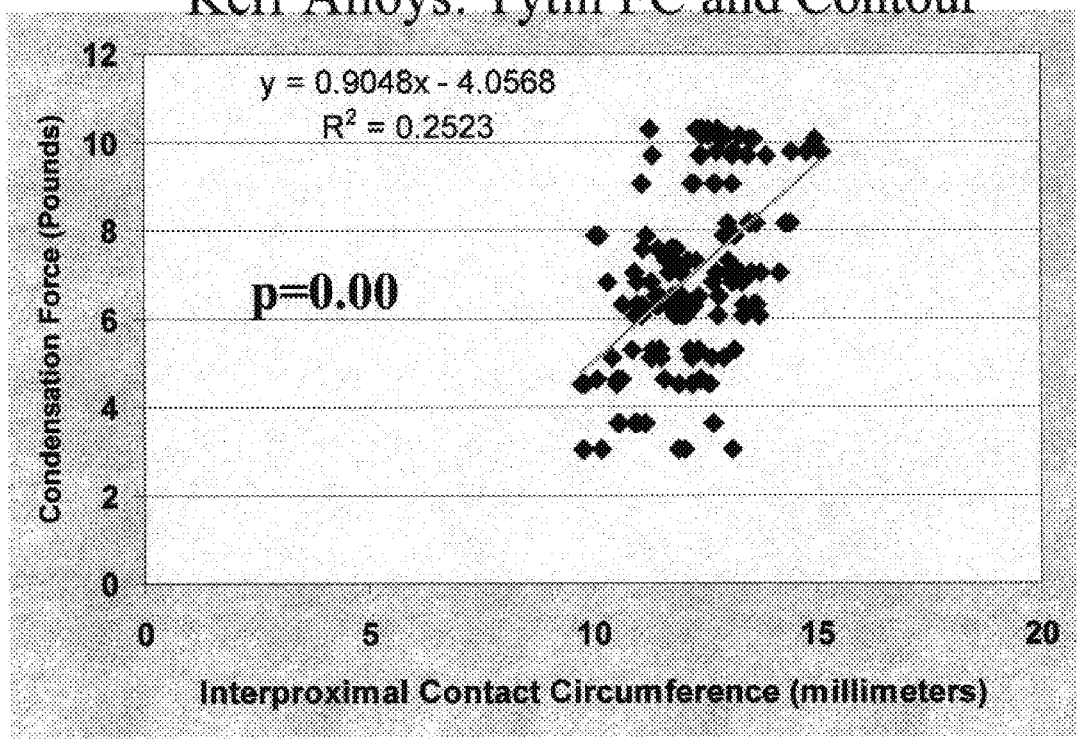
FIG. 12 shows a chart of the condensation force of certain Kerr alloys in relation to the interproximal contact circumference.
Figure 13:
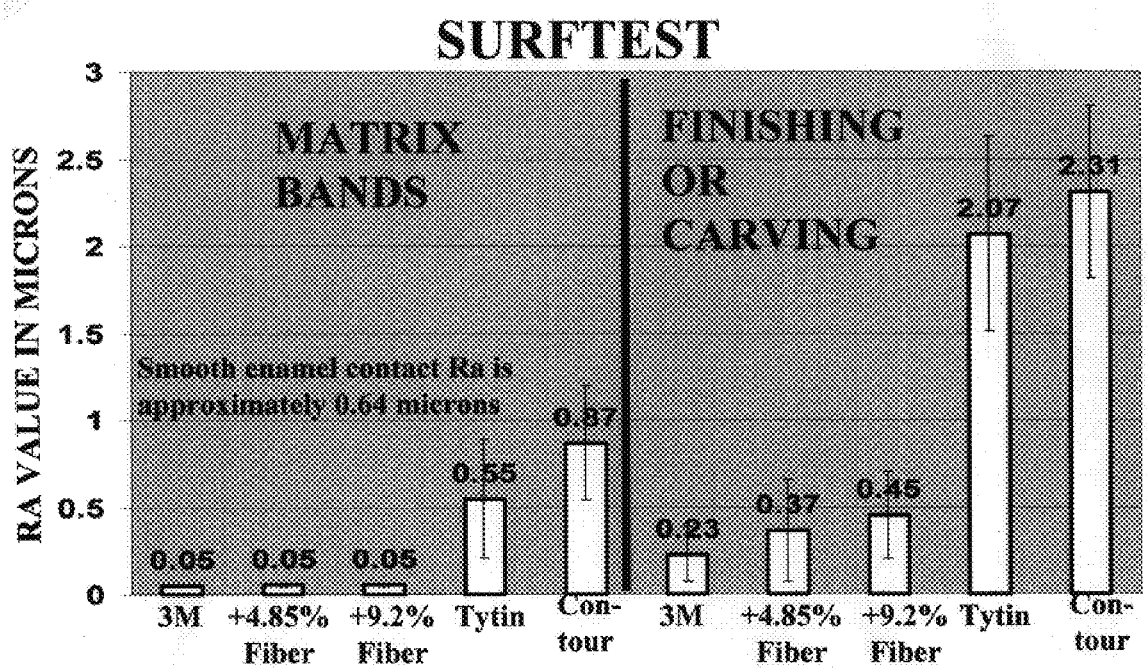
FIG. 13 shows a chart of the RA value in microns of various composite materials tested in connection with the present invention.

A general trend is noted between interproximal contact circumference values and peak condensation forces. Within each similar materials group including either alloys or composites, correlation appears significant. The percent weight addition of high purity chopped quartz fiber to Z100 is correlated with larger interproximal contact circumference p=0.00 (FIG. 9) and also increased peak condensation forces p=0.00 (FIG. 10). The resulting interproximal contact circumference area correlated with peak condensation forces when chopped quartz fiber is added to the commercial Z100 paste P=0.00 (FIG. 11). Interproximal contact areas can be correlated again with peak condensation forces in the silver alloys p=0.00 (FIG. 12).

Voids and Edge Defects

In the above discussion on the interproximal contact, average condensation forces of higher viscosity reinforced composites with quartz fiber or combination of quartz fiber/UHMWPE were three and two times greater, respectively, than the pure commercial form of paste of Z100. Such placement pressures allow compaction of the bulk mass prior to curing and, in effect, extrude excess resin into line angles and around circumscribed retained edges. The extent of these measured sources may possibly reflect the nature by which the reinforcement reduces voids-defects. The quartz fiber increases viscosity at a disproportionately higher level than UHMWPE powder which then allows better controlled handling and condensation of the dental pastes. Quartz fiber as a carrier of resin associated with Bingham plastic flow and internal resin extrusion into voids, internal line angles and edges may be another reason for the improved results over particulate filler. Highly condensable quartz fiber reinforced dental composites demonstrate solid positive placement similar to amalgam condensation that allows the condensing instrument to be removed without the difficulty identified with normal resin adhesion.

Suggestions in this field for an ideal composite include one that exhibits Bingham Body flow. This recommendation has been offered in response to dissatisfaction with the new flowable resins that are characterized as gluey, excessively slumping and unmanageable. Bingham flow on the other hand will not shear to exhibit normal Newtonian flow until a critical yield stress is reached; allowing easy manipulation and placement, demonstrated by the chopped quartz fiber reinforced Z100 paste. Quartz fiber reinforced experimental formulations do not slump under their own weight as does the commercial composite. The same quartz fibers incorporated into the commercial composite qualify for this type of Bingham Plastic behavior, observed through yielding excess resin that extrudes out onto the surface and associated restorative walls seen through clear Mylar matrices.

With this concept in mind, a strengthed adhesive underlayer can be initially placed using a highly reinforced universal composite, such as Z100. Then with a Bingham plastic quartz fiber reinforced formula placed over to safely condense and strengthen this adhesive substrate layer, controlled flow can be provided into hard-to-access areas without the detrimental effects of pooling low viscosity bonding resins or the possibility of forming edge defect voids. Any uncured low molecular weight bonding resins introduced under the initial Z100 adhesive layers will only flow that much further under the compressive force of fiber reinforced condensable Bingham plastic composites.

Finishing and Surface Roughness

In the development of a high purity chopped quartz fiber for posterior dental composite applications, one of the biggest concerns has been the eventual surface roughness. The surface roughness, in turn, has been significantly correlated with bacterial colonization. The use of glass fiber or rod filler was considered for the initial reinforcement in the 1961 formulation of the Bis-GMA composite. Even earlier, glass wool was suggested by German manufactures before the end of World War II.

Caulk (Dakor) and 3M (Addent) introduced commercial dental composites containing glass fiber on the order of 100–200 microns in length, which were eventually removed from the market. The reason for discontinuing this development of glass fiber reinforced composites may have been a result, in part, of negative articles which were published in the Journal of the American Dental Association at that time. Profilometer studies were initiated and published in JADA by 1969 indicating the increased surface roughness caused by glass rods. A similar JADA article in 1971 eventually questioned the use of glass fiber based on a concern for surface roughness. This 1971 study further noted poor bonding of the glass rod filler to the resin matrix along with shattered fragments and large void spaces that would have contributed to the lower mechanical properties tested.

To test the extended clinically-related hypothesis that there is no difference in surface roughness following normal dental finishing or matrix procedures between a performance commercial posterior composite and the same composite product incorporated with chopped quartz fiber, a profilometer Surftest analysis was initiated. UHMWPE particulate was also included with chopped quartz fiber in a third group and two of the most current popular silver amalgams were evaluated as the accepted general standards for posterior fillings.

A series of 5 mm diameter holes were drilled 6–8 millimeter from the edge of a 7 mm thick 111×111 mm square ceramic tile to allow easy rotary finishing by a high speed dental handpiece. Five holes were drilled for each group to be tested. The five different groups included:
1. 3M Z100 Universal Dental Composite
2. 3M Z100 incorporated with 9.2% high purity chopped quartz fiber
3. 3M Z100 incorporated with 4.5% quartz fiber and 4.5% UHMWPE (9.3% total)
4. Tytin FC Kerr Dental high copper spherical alloy
5. Contour Kerr Dental high copper admix alloy with both spherical and lathe cut particles.

The three composites were condensed into the ceramic cavities by first confining the bottom side with a Mylar matrix strip reinforced with a ¼ inch glass slab fixed onto the ceramic tile with clamps. Each composite was condensed for one minute to an approximate 2 mm depth using a round-ended Ladmore composite instrument and cured with a Coe-Lite visible light source for a preset one minute time interval from the exposed top side of the cavity. An intermediary acrylic interlayer was placed to fill space and the final top layer of composite was overcondensed approximately 1 mm above the ceramic tile and cured with the Coe-Lite for a preset one minute interval. The resultant Mylar cured surface was exposed after removing the clamps, glass slab and Mylar film interface. The top overcondensed surface was finished back polished with the following sequence using dental rotary handpieces to achieve a horizontal, flush surface and them polished.
1. Diamond Bur
2. 10 micron diamond polishing bur
3. fluted carbide bur
4. green point
5. Prisma polishing point
6. Prisma polishing cup with both regular and extra fine pastes.

Amalgams were similarly placed as the composites. Exceptions included: (1) stainless steel matrix bands first confined the drilled opening on the lower side, (2) Trituration was accomplished with the Kerr Automix using manufacturer-preset magnetic cards for cycle speed and time, and (3) finishing-carving on the top surface was completed after overcondensing with a serrated amalgam condenser followed with an egg burnisher and carbing flush with a Hollenbeck carver. A Mitutoyo Surftest 24 Analyzer then recorded both surfaces of each group three separate times. Cutoff was set at 0.25 mm.

The roughness values of the composites at about one order of magnitude lower than the silver fillings diminish the importance of this parameter. Although one of the few statistical correlations regarding bacterial colonization indicates this should always be considered. Rotary finishing and polishing of composites was within the Surftest detection limits and could not provide statistically significant differences between composite groups following the addition of quartz fiber or UHMWPE to the commercial Z100. The surface roughness values after finishing-polishing between an advanced commercial posterior paste and the same paste filling following quartz fiber incorporation are particularly encouraging. In the event this fiber addition does present a problem, previous descriptions of a trilayer incremental curing technique with quartz fiber placed in the middle bulk should alleviate this concern. In a class II situation, Mylar film RA values suggests that this relatively flat surface area, even when finished and polished in the embrasures, should not present a deficiency in material reliability.

Other Embodiments

While the preferred embodiment of the present invention includes high purity chopped quartz fibers of at least 3 mm in length, it is also contemplated that less pure, silica-based fibers be used wherein an increase in material strength may still be attained. Similarly, the present invention encompasses fiber lengths of as little as 1 mm as this length is still far greater than any other filler material practically employed in this field of art. Such extreme lengths, in fact, have been summarily rejected as being wholly impractical for finishing purposes.

In addition, the incorporation of long fibers into dental composites for the development of thickened consistency pastes will also benefit adhesives at lower viscosities. Such fiber-based adhesives, or scrim, can control resin placement, act as a reinforcement and work to internally pack resin through polymer matrix extrusion into interfacial pores and line angles that would concentrate stresses to weaken the adherent bond if left unfilled. At approximately 10-microns in diameter, chopped fiber reinforcement will also benefit the various dental cements and bases and not interfere with current dental tolerances at proper loading levels. Further, while the present invention is focused toward a class II restoration, all of the standard classes of filling designs are contemplated; including classes I, III, IV and V.

The chopped fiber dental material herein disclosed could also advance thermoplastic or thermoset manufactured teeth, refine properties in the clinical practice of indirect fillings, and improve all other areas of dentistry where compressive packing is imperative to proper fabrication. Two dimensional and three dimensional weaves are yet another facet of the inventive material wherein increased strengths would be exhibited. Pre-punched material could be supplied for handling after the woven fiber is resin impregnated and pasted in. The present invention also contemplates its use in the manufacture of laboratory-made teeth or fillings that require mouth impressions, and stone casts for fabrication and cementation by the dentist using an adhesive.

Although the present invention has been described with reference to specific embodiments, those of skill in the art will recognize that changes may be made thereto without departing from the spirit and scope of the invention as set forth in the hereafter appended claims.

I claim as my invention:

1. A high-viscosity dental material, comprising:
   a resin of a polymerizable polymer with flowable characteristics; and
   a plurality of chopped-glass fibers mixed directly into the resin such that the resin bonds directly to a surface of the chopped-glass fibers, wherein each of the chopped-glass fibers has a length of at least 1 mm, and the resulting dental material has a viscosity comparable to that of an amalgam.

2. A dental material as claimed in claim 1, wherein each of the chopped-glass fibers has a length of at least 2 mm.

3. A dental material as claimed in claim 1, wherein each of the chopped-glass fibers has a length of at least 3 mm.

4. A dental material as claimed in claim 1, wherein the chopped-glass fibers are comprised of less than 60% by weight silica.

5. A dental material as claimed in claim 1, wherein the chopped-glass fibers are comprised of 60–70% by weight silica.

6. A dental material as claimed in claim 1, wherein the chopped-glass fibers are comprised of greater than 70% by weight silica.

7. A dental material as claimed in claim 1, wherein the chopped-glass fibers are quartz.

8. A dental material as claimed in claim 1, further comprising:
   a radiopaque material.

9. A dental material as claimed in claim 8, wherein the radiopaque material includes Barium.

10. A dental material as claimed in claim 8, wherein the radiopaque material includes Zirconium.

* * * * *

UNITED STATES PATENT AND TRADEMARK OFFICE
CERTIFICATE OF CORRECTION

PATENT NO. : 6,270,348 B1
DATED : August 7, 2001
INVENTOR(S) : Petersen

It is certified that error appears in the above-identified patent and that said Letters Patent is hereby corrected as shown below:

Column 4,
Line 13, change "9.95%" to -- 99.99% --.
Line 67, change "TEGMA" to -- TEGDMA --.

Column 8,
Line 54, change "micrograms" to -- milligrams --.

Column 9,
Line 20, change "occure" to -- Cocure --.
Line 52, change "be" to -- best --.

Column 10,
Line 4, change "0.0001" to -- 0.001 --.
Line 6, change "0.0001" to -- 0.001 --.
Line 10, change "0.00001" to -- 0.001 --.

Column 12,
Line 20, change "them" to -- then --.

Signed and Sealed this

Second Day of July, 2002

Attest:

JAMES E. ROGAN
Attesting Officer  Director of the United States Patent and Trademark Office